UNITED STATES PATENT OFFICE

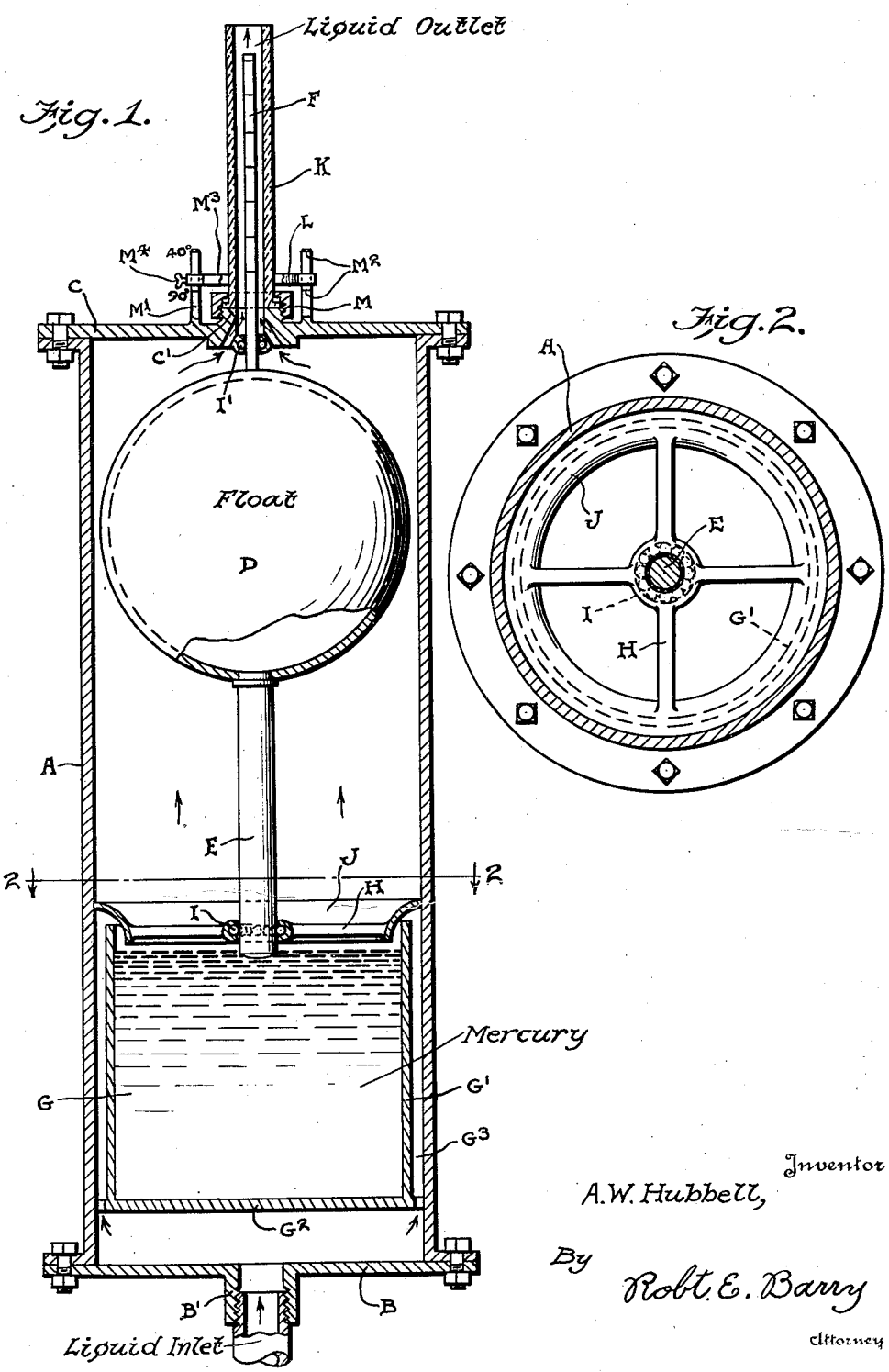

ALFRED W. HUBBELL, OF BARTLESVILLE, OKLAHOMA, ASSIGNOR TO PHILLIPS PETROLEUM COMPANY, OF BARTLESVILLE, OKLAHOMA, A CORPORATION OF DELAWARE

INDICATING LIQUID GRAVITOMETER

Application filed December 19, 1930. Serial No. 503,575.

This invention relates to an improved indicating liquid gravitometer.

The primary object of the invention is to provide an indicating gravitometer adapted to be hooked into a pipe line conveying hydrocarbon liquids, some of which have relatively high vapor pressures.

Another object is to furnish an instrument of this character for indicating the specific gravity of a liquid at superatmospheric pressure.

A still further object is to provide an indicating gravitometer including a float having a stem working in a pool of mercury or the like, the area of the surface of the pool being relatively large, so that the level is practically constant, regardless of the depth to which the stem penetrates the same.

Another object is to furnish an indicating gravitometer having an adjustable pointer which may be moved in order to correct any variation in temperature of the flowing liquid.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a vertical sectional view of my improved device.

Fig. 2 is a transverse sectional view of the same on the line 2—2 of Fig. 1.

Referring to the drawing, A designates a section of pipe or a tubular member of sufficient length and diameter to house some of the members of the instrument. A bottom plate B is bolted to the lower end of the pipe and has at its central portion a liquid inlet B' which may be connected in any suitable way to a pipe which is conveying the liquid, the specific gravity of which is to be indicated.

A top plate C is bolted to the upper end of the pipe and has at its central portion a liquid outlet C'. The pipe and end plates form a casing capable of withstanding the pressure of the fluid which travels through on its way back to the pipe line.

D is a float built to withstand the maximum operating pressure and having at its lower and upper ends respectively, a stem E and a calibrated rod F. The stem cooperates with a pool G of mercury, which is contained within a cup G' that is supported in the casing by a spider G2. This spider permits the flowing liquid to enter an annular space G3 between the wall of the cup and the pipe A.

Immediately above the space G3, an annular deflector J is fixed to the inner surface of the pipe, and it will be observed that the lower edge of the deflector projects into the open end of the mercury cup.

Another spider H is supported, either by the deflector or the upper end of the cup, and this spider supports an anti-friction bearing I which guides the stem E.

Another anti-friction bearing I' is connected to the top plate C, and functions as a centering guide for the rod F.

A gauge glass tube K having sufficient strength to withstand the pressure of the liquid, is secured to the outlet C' by any suitable packing gland M.

Posts M' project upwardly from the plate C and are calibrated as shown at M2 for temperature changes, and these posts slidably support a bar M3 which may be adjustably fixed to the posts by any suitable means such as a thumb screw M4.

My improved gravitometer has been designed especially for use in connection with pipe lines through which gasoline, liquefied gases and the like travel, and the device will be hooked up with such pipe line so that some of the liquid flowing through the line may be deflected through the gravitometer whenever desired, so as to indicate the specific gravity of the flowing liquid. Consequently, the float D plus its stem E and rod F, will have the same weight as the same volume of the heaviest liquid that will flow through the line and is displaced by said members. As the specific gravity changes due to a lighter product, the float will naturally fall until it reaches such a point that the pressure of the mercury pool on the bottom of the stem E will prevent further descent. The distance that the float assembly travels through any change in specific gravity of the liquid flowing through the apparatus will depend upon the area of the bottom of the stem upon which the mercury exerts pressure.

In operation, the liquid which is to have its specific gravity indicated will be permitted to flow from the pipe line into the inlet B'. From the latter, it will pass through the spider G2 up the annular space G3, and then it will be deflected by the member J on to the surface of the mercury pool G. It will then flow up past the float D and out through the glass tube K and back into the pipe line to continue on its way to its destination. In practice, this gauge glass has a connection attached to the top and this outlet is tied back into the main line at any point where the pressure is less than that of the liquid entering at the bottom of the apparatus through the inlet pipe. This flow my be accomplished by placing a restriction in the main line between the inlet to the apparatus and the outlet of the same, or tying the inlet into the discharge of a pump and the outlet into the suction of the same pump. We will then get a flow from a point of high pressure in any line to a point of lower pressure. The bar M3 being stationary, the calibrated rod F will cooperate with the same so as to indicate the specific gravity of the flowing liquid. The bar will be manually adjusted at such time to correspond with the temperature of the flowing liquid, so as to correct for any variation in temperature of the same. This is accomplished by manually sliding the bar M3 up or down on the supports M2.

With regard to the function of the baffle H, it will be noted that when any liquid is flowing through a conduit, it will naturally follow the path of least resistance which would, in the case of my indicating gravitometer, be through the passageway G3 and up and around the float and directly through the outlet tube K. If the baffle were not present, one would then have a portion of the mercury container that would be full of a liquid having a different specific gravity from the liquid then flowing through the instrument. In order to clean this stagnant liquid from the instrument, I have found it essential to use the baffle H to deflect the flow downwardly on to the pool of mercury. Then it will flow in an upward direction and thus scavenge the entire instrument in a very short period of time. The deflector has a very decided advantage, in that it corrects the lag that exists in any instrument of this type when the liquid flowing through the same changes from time to time.

Heretofore it has been proposed to pass a liquid through an open container in which a float rises and falls, the float having a stem operating in a tube of mercury. Because of the construction of such device, this measurement must take place under atmospheric pressure, and it could not operate to record the specific gravity of a liquid with a vapor pressure which at the flowing temperature, is above atmospheric pressure. My device will indicate the specific gravity of any liquid flowing through the same at any pressure up to the strength of the materials of which the device is constructed. Furthermore, in the prior art device mentioned, the float stem is supported by mercury in a U-tube, and due to the small area of the surface of the mercury, as the stem moves up and down, the mercury in the tube will also rise and fall, which makes for an inaccurate reading of the instrument. In my device, the area of the mercury is relatively large in comparison with the lower end of the stem, so that the level is practically constant, regardless of the amount of stem that is submerged in the same.

It is believed from the foregoing that those skilled in the art will readily understand the construction, operation and advantages of the invention, and it is manifest that changes may be made in the details disclosed, without departing from the spirit of the invention, as expressed in the claims.

What I claim and desire to secure by Letters Patent is:

1. An indicating gravitometer comprising a closed casing having an inlet and an outlet, a float in the casing, a pool of mercury in the casing, a container in the casing for said pool, a stem depending from the float into the mercury pool and of materially less diameter than the diameter of the free surface of the pool, means actuated by the float for indicating specific gravity of a liquid flowing through said casing, and means for causing liquid travelling through the casing to fall upon said surface.

2. An indicating gravitometer comprising a closed casing having an inlet and an outlet, a float in the casing, a pool of mercury in the casing, a container in the casing for said pool, a stem depending from the float into the mercury pool and of materially less diameter than the diameter of the free surface of the pool, means actuated by the float for indicating specific gravity of a liquid flowing through said casing, and a deflector for causing liquid travelling through the casing to fall upon the surface of the mercury.

3. An indicating gravitometer comprising a closed casing having an inlet and an outlet, a float in the casing, a pool of mercury in the casing, a container in the casing for said pool arranged between the inlet and outlet, a passageway in the casing placing the inlet and outlet in communication, a stem depending from the float into the mercury pool and of materially less diameter than the diameter of the free surface of the pool, and means actuated by the float for indicating specific gravity of a liquid flowing through said casing, said indicating means including a calibrated rod secured to the float and a pointer with which the rod cooperates.

4. An indicating gravitometer comprising a closed casing having an inlet and an outlet, a float in the casing, a pool of mercury in the casing, a container in the casing for said pool, a stem depending from the float into the mercury pool and of materially less diameter than the diameter of the free surface of the pool, and means actuated by the float for indicating specific gravity of a liquid flowing through said casing, said indicating means including a calibrated rod fixed to the float and a pointer cooperating with the rod and adjustably mounted to correct for any variation in temperature of the flowing liquid.

5. An indicating gravitometer comprising a closed casing having an inlet and an outlet, a float in the casing, a pool of mercury in the casing, a container in the casing for said pool, a stem depending from the float into the mercury pool and of materially less diameter than the diameter of the free surface of the pool, means actuated by the float for indicating specific gravity of a liquid flowing through said casing, said indicating means including a transparent tube, a calibrated rod operated by the float and working in the tube, fixed posts, and a pointer adjustably mounted on said posts and cooperating with said rod.

6. An indicating gravitometer comprising a closed casing having an inlet and an outlet, a cup arranged in the casing, a pool of mercury supported by the cup, a deflector for causing liquid flowing through the casing to fall upon the free surface of the mercury, a float in the casing having a stem resting on the mercury, a calibrated rod actuated by the float and extending out of the casing, posts mounted on the casing and calibrated for temperature, and a pointer cooperating with the rod and adjustably mounted on said posts.

7. An indicating gravitometer comprising a vertically disposed closed casing having an inlet at its bottom and an outlet at its top, a float in the casing, a pool of mercury in the casing below the float, a container in the casing for said pool, said container being so arranged in the casing that liquid entering the inlet flows past the container to the outlet, a stem depending from the float into the mercury pool and of materially less diameter than the diameter of the free surface of the pool, and means actuated by the float for indicating specific gravity of a liquid flowing through said casing from the inlet to the outlet.

8. An indicating gravitometer comprising a closed casing having an inlet and an outlet for a pressure liquid, a float in the casing, a pool of mercury in the casing, a container in the casing for said pool, a stem depending from the float into the mercury pool, means actuated by the float and extending to the exterior of the casing for indicating the specific gravity of a liquid flowing through the casing, and means for causing liquid travelling through the casing to impinge upon the free surface of the pool.

In testimony whereof, I hereto affix my signature.

ALFRED W. HUBBELL.